United States Patent [19]

Skoultchi

[11] 4,354,008

[45] Oct. 12, 1982

[54] PRESSURE SENSITIVE, HOT MELT ADHESIVES

[75] Inventor: Martin M. Skoultchi, Somerset, N.J.

[73] Assignee: National Starch and Chemical Corporation, Bridgewater, N.J.

[21] Appl. No.: 260,968

[22] Filed: May 6, 1981

[51] Int. Cl.³ .............................................. C08L 33/08
[52] U.S. Cl. .................................... 525/370; 525/371; 525/330.6
[58] Field of Search ........................ 525/370, 371, 329

[56] References Cited

U.S. PATENT DOCUMENTS

| | | | |
|---|---|---|---|
| 3,180,851 | 4/1965 | Pfirschke et al. | 260/47 |
| 3,532,708 | 10/1970 | Blance | 260/31.2 |
| 3,677,985 | 7/1972 | Sirota et al. | 260/27 R |
| 3,740,366 | 6/1973 | Sanderson et al. | 260/29.6 |
| 3,769,254 | 10/1973 | Anderson et al. | 260/33.4 PQ |
| 3,886,126 | 5/1975 | McKenna, Jr. | 260/33.6 A |
| 3,925,282 | 12/1975 | Davis et al. | 260/27 R |
| 4,185,051 | 1/1980 | McKenna et al. | 525/370 |

FOREIGN PATENT DOCUMENTS 1259459 1/1972 United Kingdom .

*Primary Examiner*—William F. Hamrock
*Attorney, Agent, or Firm*—E. Szala; Margaret B. Kelley

[57] ABSTRACT

A pressure sensitive, hot melt adhesive is prepared by reacting a normally tacky acrylic-based random copolymer containing from 0.5 to 10% by weight of a chelating comonomer with a chelatable transition metal salt. Preferably the adhesives are oven cured for a short time after application. The chelating comonomer is a beta-hydroxypropyl (meth)acrylate ester of an ortho-hydroxy aromatic acid such as 2-hydroxy-3-(2-hydroxy-benzoyloxy)propyl methacrylate. The metallic salt (e.g. zirconium, ferric, cobalt, or aluminum acetylacetonate) contains a metal ion having a valence greater than 1 and a coordination number greater than 2 and an anion capable of forming a volatile by-product. One or more thermally reversible chelate rings incorporating the metal ion are formed thus crosslinking the polymer chains.

14 Claims, No Drawings

PRESSURE SENSITIVE, HOT MELT ADHESIVES

BACKGROUND OF THE INVENTION

This invention relates to chelated, acrylic-based pressure sensitive adhesives which may be applied as hot melts. It also relates to an improved process for preparing these adhesives by controlling, not only the degree of reversible crosslinking via the amount of chelating conomomer used, but also via partial or complete chelation. It further relates to the use of the chelated pressure sensitive adhesives to form coated articles.

As used herein, the term "chelated copolymer" refers to a higher molecular weight, cohesive copolymer formed when a low molecular weight, normally tacky random copolymer containing a chelating comonomer is reacted with a chelatable transition metal salt containing a metal ion having a valence greater than 1 and a coordination number greater than 2. Interaction between the polymer chains, via the formation of thermally reversible chelate rings (chelates), causes crosslinking. When less than the maximum number of chelate rings are formed, the copolymer is referred to as "partially chelated copolymer". The term "chelating comonomer" refers to a monomer having reactive sites located in such positions that they can form a stable chelate ring incorporating the metal ion.

Pressure sensitive adhesives are viscoelastic materials which in solvent-free form remain permanently and aggressively tacky and which will adhere instantaneously to most solid surfaces with the application of very slight pressure. Hot melt adhesives are applied in a molten state and form a bond on cooling to the solid state.

Acrylic-based polymers have found extensive use as the base polymers for water-based and solvent-based pressure sensitive adhesive compositions because of their clarity, adhesion to non-primed surfaces, good aging characteristics, as well as excellent properties of tack, peel, and cohesive strength. Attempts to utilize these acrylic-based polymers in pressure sensitive, hot melt adhesives have not generally proven successful, however, because of the difficulties associated with the required melt viscosity. In order to have a hot melt adhesive that is sufficiently fluid at application temperatures, either a very low molecular weight polymer must be used or a high molecular weight polymer must be extended with a high proportion of low molecular weight oils or resins (tackifiers) to reduce the melt viscosity. Both of these alternatives are undesirable. The low molecular weight polymers will produce adhesives which lack cohesive strength unless subjected to an additional crosslinking step subsequent to application, such as exposure to ultraviolet radiation or electron beam radiation (see, respectively, U.S. Pat. Nos. 4,052,527 and 4,234,662 issued Oct. 4, 1977 and Nov. 18, 1980 to S. D. Pastor et al.). The use of high molecular weight polymers necessitates the use of expensive additives which frequently detract from the cohesion, adhesion, or tack of the resultant adhesive. In the past, it has often been necessary to compromise certain properties of these hot melts in order to obtain a workable adhesive having a very narrow range of utility.

Attempts have been made to produce acrylic-based hot melt adhesives exhibiting pressure sensitive properties by incorporating, in copolymer systems which have reactive sites supplied by comonomers, salts which crosslink with the reactive sites, thus producing an adhesive with improved cohesive strength. Such attempts have included crosslinking copolymers containing hydroxyl groups by reaction with metal alkoxides (e.g. tetrabutyl titanate) as in U.S. Pat. No. 3,532,708 issued Oct. 6, 1970 to R. B. Blance and polyvalent metallic salts (e.g. zinc acetate) as in Brit. Pat. No. 1,259,459 published Jan. 5, 1972 to A. M. Citrone et al.; those containing carboxyl groups, optionally substituted with ammonium or amine groups, by reaction with polyvalent metallic salts (e.g. zinc and cadmium acetate, glycinate, or glycollate) as in U.S. Pat. No. 3,740,366 issued June 19, 1973 to F. T. Sanderson; and those containing hydroxyl, carboxyl, or enolizable keto groups by reaction with esters of orthotitanic acid (e.g. dialkoxytitanium diacetylacetonate) as in U.S. Pat. No. 3,886,126 issued May 27, 1975 to L. W. McKenna, Jr. Hydrated aluminum nitrate and metal alkoxides (e.g. titanium acetylacetonate) have also been used to crosslink hydroxyl- or carboxyl-containing copolymers as described, respectively, in U.S. Pat. No. 3,677,985 issued July 18, 1972 to J. Sirota et al. and U.S. Pat. No. 3,769,254 issued Oct. 30, 1973 to C. C. Anderson et al.

However, these crosslinked acrylic-based pressure sensitive adhesive formulations have not been successful as hot melts either because the crosslinks formed by the reaction with the metallic salts are not broken or dissociated at the temperatures normally encountered during hot melt application (i.e. 70°–175° C.) or because the crosslinks are irreversible, as is the case with carboxyl-containing copolymers, and will not reform after being broken.

Hence, there is a need in the art for pressure sensitive, hot melt adhesive formulations which possess the reversible properties of strong cohesive strength at ambient temperatures, as well as desirable melt viscosity at the application temperatures used for hot melts.

One such acrylic-based pressure sensitive, hot melt adhesive formulation is described in U.S. Pat. No. 3,925,282 issued December 9, 1975 to I. Davis et al. The copolymers contain tertiary amine-containing monomers (e.g. diethylaminoethyl methacrylate or 4-vinyl pyridine) which provide the reactive sites. Reversible crosslinks are formed by coordination of an organic metallic salt (e.g. cupric laurate, zinc resinate, cadmium octoate, etc.) with the reactive amine site which donates electrons to the electron deficient metal ion.

It is an object of this invention to provide pressure sensitive, hot melt adhesives based on the reaction product of acrylic-based copolymers containing a chelating comonomer reacted with selected chelatable metallic salts.

SUMMARY OF THE INVENTION

The above objects are achieved by the acrylic-based copolymers described herein prepared by polymerizing at least 40% by weight of a $C_2$ to $C_8$ alkyl acrylate or methacrylate ester monomer, 0.5–10% by weight of a chelating comonomer, and 0–59.5% by weight of a copolymerizable comonomer in the presence of a free radical catalyst and an organic solvent to form a copolymer/solvent mixture containing a low molecular weight, normally tacky random copolymer, preferably at a high solids content, and reacting the thus formed copolymer with a chelatable metallic salt to form reversible crosslinks via the formation of one or more chelate rings. The degree of crosslinking may be contriolled by varying, not only the amount of chelating comonomer used, but also the amount of chelatable metallic salt used in relation to the amount of chelating comonomer present in the copolymer. The chelating comonomer, which contains hydroxyl and ester groups as the reactive sites, is a beta-hydroxypropyl (meth)acrylate ester of an ortho-hydroxy aromatic acid (e.g. 2-hydroxy-3-(2-hydroxy-benzoyloxy)propyl methacrylate).

The chelatable metallic salt is a transition metal salt containing a metal having a valence greater than 1 and a coordination number greater than 2 and an inorganic or organic anion capable of forming a volatile by-product. Typical metallic salts include, for example, aluminum, zirconium, ferric and cupric acetylacetonate; tin, ferric and cobalt chloride; and cupric and zinc acetate. Suitable anions should form a volatile by-product art a temperature between ambient temperature and the hot melt application temperature (i.e. 70°–175° C.). The preferred anion is acetylacetonate. Mixtures of metallic salts may be used to provide the desired properties in the adhesive.

The reversible crosslinking effected by a typical chelating comonomer (e.g. 2-hydroxy-3-(2-hydroxy-benzoyloxy)propyl acrylate) and chelatable metallic salt (e.g. zinc acetate) and the chelate rings incorporating the metal ions are believed to be represented as follows:

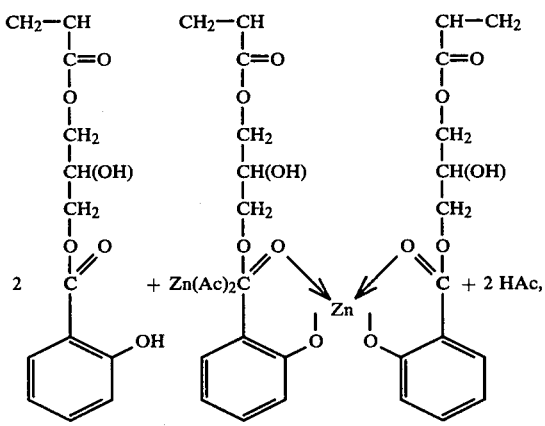

wherein Ac represents acetate and HAc represents acetic acid. The metal ion is joined to the ester groups of the chelating comonomer by coordinate covalent bonds and to the hydroxyl groups of the chelating comonomer by much stronger bonds which have a high degree of ionic characteristics.

The adhesives have good cohesive and adhesive strength, as well as reversible yet strong crosslinks formed by chelation with the metallic salt. In contrast with the previously discussed reversible crosslinks formed by coordination with acrylic-based polymers having amine-containing comonomers, these crosslinks are stronger since the metal ion is believed to be bound by a more ionic bond, as well as by the coordinate covalent bonds, to the chelating comonomer, and the anion is removed as a volatile by-product and hence can not interfere with reformation of the reversible coordinate crosslinks on cooling.

DESCRIPTION OF THE PREFERRED EMBODIMENTS

The pressure sensitive, hot melt adhesives of this invention have melt viscosities between about 1000 and 25,000 cps., preferably from about 5000 to 10,000 cps., at the application temperatures. The acrylic-based random copolymers contain one or more of the acrylate or methacrylate ester monomers which typically form normally tacky polymers, such as the $C_2$–$C_8$ n-alkyl esters of acrylic and methacrylic acid and the corresponding branched isomers, (e.g. 2-ethylhexyl acrylate). Optionally, the copolymer may be prepared with any of one or more copolymerizable ethylenically unsaturated comonomers which do not adversely affect the desired cohesive strength and the required melt viscosity. Typical copolymerizable comonomers include, for example, the $C_1$ and $C_9$–$C_{18}$ alkyl acrylate and methacrylate esters such as methyl acrylate and stearyl acrylate; acrylonitrile and methacrylonitrile; acrylamide and methacrylamide; styrene and α-methyl styrene; $C_2$–$C_{10}$ vinyl esters, such as vinyl acetate or vinyl propionate, vinyl ethyl ether, vinyl chloride, and vinylidene chloride; maleic anhydride; ethylene; and the like.

the chelating comonomers used in the preparation of the acrylic-based polymers include the beta-hydroxypropyl esters of ortho-hydroxy aromatic acids, such as 2-hydroxy-3-(2-hydroxy-benzoyloxy)propyl acrylate or methacrylate, 2-hydroxy-3-(1-hydroxy-2-naphthoyloxy)propyl acrylate or methacrylate, 2-hydroxy-3-(2-hydroxy-3-naphthoyloxy)propyl acrylate or methacrylate, or 2-hydroxy-3-(2-hydroxy-1-naphthoyloxy)propyl acrylate or methacrylate, or 2-hydroxy-3-(2-hydroxyphenoxy)propyl acrylate or methacrylate. It may be possible to use other chelating comonomers so long as they contain a copolymerizable group, such as an ethylenically unsaturated group, and two reactive sites (i.e. hydroxyl and ester) located in such a way that they are capable of forming one or more stable chelate rings (typically 5 or 6 membered) incorporating the metal ion of the chelatable metallic salt.

The required acrylate ester monomer will typically constitute at least about 40% by weight of the total polymer, preferably about 45°90% depending upon the adhesive's end use. The amount of chelating comonomer used will vary depending upon the particular required acrylic monomer(s) selected and the chelatable metallic salt employed, as well as the end use of the pressures sensitive adhesive being prepared. The amount used typically ranges from about 0.5–10% be weight, based on the total copolymer weight; the preferred amount is about 2–5% by weight. The remainder of the copolymer comprises the optional copolymerizable comonomer(s).

Within the above parameters, any combination of comonomers may be selected providing, however, that the polymers employed in preparing the adhesives herein have a glass transition temperature below about =5° C. prior to crosslinking. They are essentially fluid, low cohesive materials which develop their cohesive strength only after crosslinking with the chelatable metallic salt.

As will be recognized by the skilled practitioner, the preparation of the above copolymers can be carried out using well-known free radical initiated polymerization procedures. Thus, the acrylic-based random copolymers containing the chelating comonomer may be produced by solution, emulsion, or bulk polymerization procedures. Preferably the polymerization is carried out in a solvent, and the solvent is thereafter stripped from the system after the addition of the chelatable metallic salt. The stripping can be carried out under reduced pressure at temperatures not exceeding 125° C.

The chelatable metallic salts which are reacted with the above copolymers to provide reversible crosslinks via chelation include salts of transition metals which contain a metal ion having a valence greater than 1 and a coordination number greater than 2 and, as the counter-ion, an inorganic or organic anion capable of forming a volatile mateial as a by-product. Transition metals having a coordination number greater than 2, typically 4 or 6, are suitable for use herein; the better coordinating metals such as zirconium and iron (III) are preferred. The most suitable metallic salts for formulating the pressure sensitive, hot melt adhesives herein include salts of tin (II and IV), iron (II and III), cobalt and zirconium. The practitioner will recognize that iron, cobalt, nickel and copper will form colored chelates and should not be used if a colorless adhesive is desired.

Most of the adhesives will benefit from a short curing at a temperature higher than the volatilization temperature of the anion by-product; such curing improves their high temperature performance. The curing time and temperature will depend upon the particular required acrylate or methacrylate ester monomers used, the chelating comonomer used, the optional copolymerizable comonomer used, if any, the chelatable metallic salt used, the violatilization temperature of the anion by-product, and the required end use for the adhesive.

The metallic salts may be present in an amount less than or in excess of the stoichiometrically equivalent amount required to form the maximum number of chelate rings, based on the weight of the chelating monomer present in the copolymer. The precise amount of metallic salt used will depend on the degree of cohesion required in the particular end use since different metal ions form bonds of varying strength, as previously discussed. Thus, the metallic salt may be used in an amount sufficient to form the maximum number of chelate rings (i.e. three for a metal such as aluminum which can have a coordination number of 6) or in an amount insufficient to form the maximum number of chelating rings when the better coordinating metals (e.g. Fe III and Zr) are used or when a less cohesive copolymer is desired.

Typically the metallic salt(s) will be used in an amount of from about 0.1 to 2 or more equivalents, preferably 0.5 to 1 equivalent, based on the equivalent amount of chelating comonomer. The metallic salt(s) may be added directly to the copolymer after stripping of the solvent (i.e. added directly to the hot melt). Preferably the metallic salts are dissolved in a compatible solvent and then added to the copolymer solution prior to stripping.

The adhesive compositions thus formed may also comprise various other additives such as plasticizers, tackifiers, fillers, etc. which are conventionally used in the preparation of hot melt and/or pressure sensitive adhesives. They find application in a wide variety of products such as vinyl wall coverings, tapes, labels and decals, as well as in such other applications wherein pressure sensitive acrylics are presently employed. The hot melt compositions offer the advantage of eliminating the need for solvent removal after application of the adhesive, while providing a composition possessing good cohesive and adhesive properties.

During use, the hot melt adhesive need only be heated to a temperature of about 70° to 175° C. to render the composition fluid and flowable and to allow the composition to remain flowable for the time required for application thereof.

If the pressure sensitive adhesive compositions are to be applied to a backing or substrate, this procedure may be accomplished using any conventional means such as roller coating, dip coating, extrusion, or spray coating. The backing onto which the adhesive composition is applied may be selected from a variety of materials, including textile fabric, plastic film, nonwoven fiber sheets, metal sheets or foil, rubber or synthetic rubber, decorative sheets, plywood, decals, etc. If the coated substrate is to be used in the form of a roll, the back of the tape is usually coated with a release backsize or adhesive coating. Double-sided coated adhesive articles may also be prepared and a strippable paper or other protective means inserted if the article is to be rolled. Additionally, substrates may be laminated onto the adhesive-coated backing in situ, e.g. the hot melt coating may be applied to the backing and the substrate placed over the adhesive. Alternatively, a pressure sensitive adhesive film may be formed by applying the hot melt to a release material such as silicone coated paper; thereafter when the adhesive is to be employed, it may then be stripped from the release material and used as a film.

The following examples will more fully illustrate the embodiments of this invention. In the examples, all parts and percentages are given by weight and all temperatures are in degrees Celsius unless otherwise noted.

The comparative cohesive properties of the various pressure sensitive adhesives herein were measured using the 180° Hold Test. This test measures the internal (cohesive) strength of the adhesive. In conducting the test, films of the adhesive being evaluated are applied to a 2 mil Mylar (polyethylene terephthalate) backing in a 1.5 mil thickness. The test samples (1×3 inches) are securely adhered by thumb pressure to the top of a ½ inch chrome-steel bar. The bar is in a position in which the film makes a 180° with the vertical. Thereafter, a 500 gram weight is secured to the sample and the time required for the film to separate or delaminate from the bar is recorded as the "180° Hold" value.

EXAMPLE I

This example illustrates the preparation of typical copolymers containing 2-hydroxy-3-(2-hydroxy-benzoyloxy)propyl methacrylate as the chelating comonomer and two chelatable metallic salts. The chelated copolymers were evaluated as hot melt adhesives which were applied at about 135° C.

A reaction vessel fitted with a thermometer, stirrer, and condenser was charged with 95 parts octyl acrylate, 5 parts 2-hydroxy-3-(2-hydroxy-benzoyloxy)propyl methacrylate, 100 parts ethyl acetate, and 0.25 part dibenzoyl peroxide. The mixture was heated, while under agitation, until reflux was attained. Heating was continued at reflux temperature for 8 hours to complete the polymerization. The resulting copolymer/solvent mixture (49.9% solids—99.8% conversion) was formulated with 1.94 parts of aluminum acetylacetonate (1 equivalent per equivalent of chelating comonomer) dissolved in methanol and stirred until homogeneous. Volatiles were removed under reduced pressure at a temperature not exceeding 125° C. to give hot melt adhesive I-A.

Additional adhesives were formulated using the same copolymer and 1.75 parts (1 equivalent) zirconium acetylacetonate (I-B), 0.95 part (1 eqivalent) aluminum naphthenate (I-C), and no metallic salt (I-D).

The resulting adhesives were evaluated using the 180° Hold test previously described. Air dried and oven cured adhesives were compared. The results are summarized in Table I.

TABLE I

| Adhesive | Air Dried 180° Hold at 24° C. (min.) | Oven Cured (5 mins. at 110° C.) | |
|---|---|---|---|
| | | 180° Hold at 24° C. (min.) | 180° Hold at 75° C. (min.) |
| I-A | <1 | >60 | 30 |
| I-B | <1 | >60 | >60 |
| I-C (comparative) | <1 | <1 | <1 |
| I-D (control) | <1 | <1 | <1 |

The results show that the control (I-D) which contained no metallic salt, did not crosslink and had no useful adhesive properties. Adhesive I-C, which contained a chelatable metallic salt (i.e. aluminum naphthenate) having an anion incapable of forming a volatile by-product at the application temperature, did not crosslink even after oven curing and its adhesive properties were not better than the control. Adhesives I-A and I-B, which contained chelatable metallic salts having an anion capable of forming a volatile by-product (i.e. acetylacetone), both showed useful adhesive properties and improved cohesive strength due to crosslinking via the formation of chelates. Adhesive I-B, which contained the zirconium salt, showed better cohesion at high temperatures due to the tighter crosslinks formed by the better coordinating metal zirconium. It is also shown that room temperature drying of the films did not allow the chelates to form sufficiently as compared with brief oven drying.

EXAMPLE II

This example illustrates the preparation and evaluation of additional chelated copolymers as hot melt adhesives. The copolymers were prepared, formulated, and applied using the methods described in Example I except that additional required acrylate monomers were used, varying amounts of chelating comonomer were used, and, in some, additional optional copolymerizable comonomers were used. Tables II and III, respectively, describe the copolymers prepared and adhesives evaluated.

TABLE II

| | | Copolymers | | | | | |
|---|---|---|---|---|---|---|---|
| | Chelating[a] | Required Monomers (parts) | | Copolymerizable Comonomers (parts) | | | |
| Copolymer | Comonomer (parts) | Octyl Acrylate | Butyl Acrylate | Vinyl Acetate | Acryl-amide | Acrylic Acid | Solids (%) |
| II-A[b] | 3 | 97.0 | — | — | — | — | 50.5 |
| II-B-1 | 5 | 47.5 | 47.5 | — | — | — | 51.0 |
| II-B-2[b] | 5 | 47.5 | 47.5 | — | — | — | 49.9 |
| II-C | 5 | — | 95.0 | — | — | — | 49.1 |
| II-D[b] | 5 | — | 90.0 | — | 5 | — | 49.8 |
| II-E[c] | 5 | 47.5 | — | 47.5 | — | — | 69.8 |
| II-F[d] | 5 | 93.7 | — | — | — | 1.3 | 49.7 |

[a]2-hydroxy-3-(2-hydroxy-benzoyloxy)propyl methacrylate
[b]Solvent consisted of 5 parts isopropanol and 95 parts ethyl acetate instead of 100 parts ethyl acetate.
[c]Free radical catalyst was 0.15 part azoisobutyronitrile instead of 0.25 part dibenzoyl peroxide; solvent consisted of 43 parts instead of 100 parts ethyl acetate.
[d]Solvent consisted of 10 parts isopropanol and 90 parts ethyl acetate.

The results (given in Table III) show that adhesive II-A-2 formulated with the better coordinating metal (Fe III) had tigher crosslinks than the same adhesive (II-A-1) formulated with aluminum, as shown by its better cohesion at high temperatures. Adhesives II-B-1 and II-E-1 are crosslinked via chelation, whereas the control adhesives II-B-2 and II-E-2 containing no chelatable metallic salt showed no cohesive strength.

TABLE III

| | ADHESIVES | | | | | |
|---|---|---|---|---|---|---|
| Copolymer/ Solvent Mixture (200 parts) | Chelatable Metallic Salt | | Tackifier[b] (parts) | Air Dried 180° Hold at 24° C. (time) | Oven Cured (5 min. at 110° C.) | |
| | Formula | Amount[a] (parts) | | | 180° Hold at 24° C. (time) | 180° Hold at 75° C. (time) |
| II-A-1 | Al(AcAc)₃ | 1.94 | — | <1 min. | 20 min. | 5 min. |
| II-A-2 | Fe(AcAc)₃ | 2.12 | — | <1 min. | 35 min. | 15 min. |
| II-B-1 | Al(AcAc)₃ | 1.94 | — | 5 min. | Not Tested (NT) | >1 hr. |
| II-B-2[c] | — | — | — | 0.5 min. | NT | NT |
| II-C | Al(AcAc)₃ | 1.94 | — | <1 min. | NT | 40 min. |
| II-C | Al(AcAc)₃ | 1.94 | 50 | <1 min. | NT | 25 min. |
| II-C | Al(AcAc)₃ | 1.94 | 100 | <1 min. | NT | 7 min. |
| II-C | Al(AcAc)₃ | 1.94 | 150 | <1 min. | NT | 5 min. |
| II-E-1 | Al(AcAc)₃ | 1.94 | — | 24 hr. | 24 hr. | 2 hr. |
| II-E-2[c] | — | — | — | 15 min. | — | 3 min. |
| II-F[d] | Al(AcAc)₃ | 1.94 | 200 | 15 min. | >24 hr. | >24 hr. |

[a]One equivalent/equivalent of chelating comonomer.
[b]A commercially available styrene-alpha-methylstyrene copolymer.
[c]Controls wherein no metallic salt was used.
[d]Evaluated as a lacquer; polymer gelled on stripping and could not be prepared as a hot melt.

Adhesive II-F wherein the copolymer contained acrylic acid, a spontaneously crosslinkable group forming irreversible crosslinks, had improved properties but could not be prepared as a hot melt. The use of a tackifying resin allowed some adhesives to be isolated as hot melts, but there was some sacrifice in performance, as shown by the decrease in strength of Adhesive II-C as the amount of tackifier was increased. Adhesive II-E-1 containing the polar comonomer vinyl acetate had improved hold times for both the air dried and oven cured samples.

EXAMPLE III

Optionally, the chelated, pressure sensitive adhesives of the invention may be conveniently applied as a lacquer. In this variation the polymerization of the copolymer will be preferably carried out in a solvent which is thereafter utilized as the lacquer base. The chelatable metallic salt and any optional components such as are commonly found in pressure sensitive adhesive lacquers are added to the copolymer/solvent mixture.

PART A

This example illustrates a typical preparation of a pressure sensitive lacquer adhesive. The polymer was prepared as in Example I except that 55 parts octyl acrylate, 10 parts 2-hydroxy-3-(2-hydroxybenzoyloxy)-propyl methacrylate, and 35 parts vinyl acetate were used. The resulting solution (41% solids) was formulated with aluminum acetylacetonate (⅓ equivalent per equivalent of chelating comonomer) and applied to Mylar strips at ambient temperature (about 24° C.). The testing results are given in Table IV.

TABLE IV

| Adhesive | 180° Hold at 24° C. (time) | 180° Hold at 70° C. (time) |
|---|---|---|
| Air Dried | 40 min. | 4 min. |
| Oven Cured (3 min. at 120° C.) | 1 hr. | 20 min. |
| Oven Cured (15 min. at 120° C.) | >24 hr. | >24 hr. |

The results show that oven curing for a longer period of time significantly improved the high temperature cohesion as compared with the same lacquer adhesive cured for only 3 min.

PART B

This example describes the preparation of a lacquer utilizing an acrylic monomer other than the required $C_2$–$C_8$ acrylate monomer. The copolymer was prepared as in Example I except that 100 parts methyl acrylate, 2 parts 2-hydroxy-3-(2-hydroxy-benzoyloxy)propyl methacrylate, 150 parts ethyl acetate, and 0.5 part benzoyl peroxide were used, and the mixture was refluxed for 6 hours. The resulting copolymer/solvent mixture (39.8% solids—99% conversion) was diluted with acetone to a solids content of 33% and formulated with 0.75 part cupric acetate monohydrate (1 equivalent/equivalent of chelating comonomer) dissolved in 7.5 parts of an acetone-water mixture (1:1). Films cast from the solution showed no significant pressure-sensitive properties.

EXAMPLE IV

This example describes the preparation of additional hot melt adhesives wherein the copolymer may be prepared as in Example I using 45 parts vinyl acetate, 45 parts ethyl acrylate, and 10 parts 2-hydroxy-3-(1-hydroxy-2-naphthoyloxy)propyl acrylate. Similar copolymers may be prepared using 10 parts of 2-hydroxy-3-(2-hydroxy-3-naphthoyloxy)propyl acrylate or 10 parts of 2-hydroxy-3-(2hydroxy-1-naphthoyloxy)propyl acrylate. Zirconium acetylacetonate may be used in an amount of about 1 equivalent per equivalent of chelating comonomer. Comparable results would be expected.

Now that the preferred embodiments of the invention have been described in detail, various modifications and improvements thereon will become readily apparent to those skilled in the art. Accordingly, the spirit and scope of the present invention are to be limited only by the appended claims, and not by the foregoing specification.

What is claimed is:

1. A pressure sensitive, hot melt adhesive composition, which possesses the reversible properties of strong cohesive strength at ambient temperature and desirable fluidity at hot melt application temperatures, said composition comprising the reaction product of:
   (A.) a normally tacky random copolymer consisting essentially of:
      (a.) at least 40% by weight of at least one monomer selected from the group consisting of $C_2$ to $C_8$ alkyl esters of acrylic or methacrylic acid and mixtures thereof; and
      (b.) 0.5 to 10% by weight of a chelating comonomer selected from the group consisting of beta-hydroxypropyl acrylate or methacrylate esters of ortho-hydroxy aromatic acids and mixtures thereof; and
      (c.) 0 to 59.5% by weight of a copolymerizable comonomer which does not adversely affect said reversible properties, said monomer percentages totaling 100% by weight; and
   (B.) at least one chelatable metallic salt of a transition metal having a valence greater than 1 and a coordination number greater than 2 and an inorganic or organic anion capable of forming a volatile by-product at or below said application temperature, said metallic salt present in an amount sufficient to provide said reversible properties by forming one or more chelates with said chelating comonomer.

2. The composition of claim 1, wherein said chelating comonomer is 2-hydroxy-3-(2-hydroxy-benzoyloxy)-propyl acrylate or methacrylate, 2-hydroxy-3-(1-hydroxy-2-naphthoyloxy)propyl acrylate or methacrylate, 2-hydroxy-3-(2-hydroxy-3-naphthoyloxy)propyl acrylate or methacrylate, 2-hydroxy-3-(2-hydroxy-1-naphthoyloxy)propyl acrylate or methacrylate, or 2-hydroxy-3-(2-hydroxyphenoxy)propyl acrylates or methacrylate.

3. The composition of claim 2, wherein said alkyl ester of acrylic or methacrylic acid is present in an amount from about 45–90% by weight; said chelating comonomer is present in an amount of from about to 2 to 5% by weight; and said metallic salt is a salt of aluminum, zirconium, iron (II or III), copper (II), zinc, nickel, titanium (II or IV), cobalt, or tin (II or IV) and acetylacetonate, acetate, chloride, or a residue of a fatty acid, said salt being present in an amount from about 0.1 to 2 equivalents, based on the equivalent amount of said chelating comonomer.

4. The composition of claim 3, wherein said salt is zirconium, iron (II or III), cobalt, or tin (II or IV) acetylacetonate present in an amount from about 0.3 to 1 equivalent.

5. The composition of claim 1, wherein said copolymerizable comonomer is a $C_2$–$C_{10}$ vinyl ester, an amide of acrylic or methacrylic acid, or mixtures thereof.

6. The composition of claim 1, wherein said composition is the reaction product of an octyl acrylate (95%) copolymer and 0.97% aluminum acetylacetonate or 0.875% zirconium acetylacetonate; or of an octyl acrylate (97%) copolymer and 0.97% aluminum acetylacetonate or 1.06% ferric acetylacetonate; or of an octyl acrylate (47.5%)—buty acrylate (47.5%) copolymer and 0.97% aluminum acetylacetonate; or of an octylacrylate (47.5%)—vinyl acetate (47.5%) copolymer; or of a butyl acrylate (90%)—acrylamide (5%) copolymer; said copolymers containing, as said chelating comonomer, sufficient 2-hydroxy-3-(2-hydroxybenzoyloxy)propyl methacrylate to give 100%, all percentages being by weight.

7. A process for preparing a chelated pressure sensitive, hot melt adhesive composition possessing the reversible properties of strong cohesive strength at ambient temperature and desirable fluidity at hot melt application temperatures, which comprises the steps of:

(A.) polymerizing at least 40% by weight of at least one monomer selected from the group consisting of $C_2$ to $C_8$ alkyl esters of acrylic or methacrylic acid and mixtures thereof, from 0.5-to 10% by weight of a chelating comonomer selected from the group consisting of beta-hydroxypropyl acrylate or methacrylate esters of ortho-hydroxy aromatic acids and mixtures thereof, and from 0 to 59.5% by weight of a copolymerizable comonomer which does not adversely affect said reversible properties, said monomer percentages totaling 100% by weight, in the presence of a free radical catalyst and an organic solvent to form a normally tacky random copolymer;

(B.) formulating said copolymer/solvent mixture with at least one chelatable metallic salt of a transition metal having a valence greater than 1 and a coordination number greater than 2 and an inorganic or organic anion capable of forming a volatile by-product at or below hot melt application temperatures, said metallic salt present in an amount sufficient to provide the reversible properties of strong cohesive strength at ambient temperature and desirable fluidity at said application temperatures; and (C.) removing said solvent.

8. The process of claim 7, wherein said hot melt application temperature is about 70° to 175° C. and wherein said solvent is removed under reduced pressure at a temperature of 125° C. or less.

9. A method for the production of hot melt adhesive coated articles having pressure sensitive properties, comprising the steps of:

(A.) reacting a normally tacky random acrylic-based copolymer containing a chelating comonomer with at least one chelatable metallic salt to form an adhesive composition possessing the reversible properties of strong cohesive strength at ambient temperature and desirable fluidity at hot melt application temperatures;

(B.) heating the resultant copolymer containing one or more thermally reversible chelates to a temperature sufficient to render it fluid and flowable; and (C.) coating the heated copolymer onto a substrate; said copolymer consisting essentially of (a.) at least 40% by weight of at least one monomer selected from the group consisting of $C_2$ to $C_8$ alkyl esters of acrylic or methacrylic acid and mixtures thereof, (b.) 0.5 to 10% by weight of a chelating comonomer selected from the group consisting of beta-hydroxy acrylate or methacrylate esters of ortho-hydroxy aromatic acids and mixtures thereof, and (c.) 0 to 59.5% by weight of a copolymerizable comonomer which does not adversely affect said reversible properties, said monomer percentages totaling 100% by weight; and said metallic salt being a salt of a transition metal having a valence greater than 1 and a coordination number greater than 2 and an inorganic or organic anion capable of forming a volatile by-product prior to or during said heating, said metallic salt present in an amount sufficient to form one or more reversible chelates with said chelating comonomer.

10. The method of claim 9, further comprising the step of curing said coated substrate for about 1 to 15 minutes at about 75° to 150° C. and wherein said copolymer is heated to a temperature of about 70° to 175° C. to render it fluid and flowable.

11. The article of manufacture prepared by the method of claim 9 or 10.

12. a pressure sensitive, lacquer adhesive composition, comprising an organic solvent and the reaction product of:

(A.) a normally tacky random copolymer consisting essentially of:
 (a.) at least 40% by weight of at least one monomer selected from the group consisting of $C_2$ to $C_8$ alkyl esters of acrylic or methacrylic acid and mixtures thereof; and
 (b.) 0.5 to 10% by weight of a chelating comonomer selected from the group consisting of beta-hydroxy acrylate or methacrylate esters of ortho-hydroxy aromatic acids and mixtures thereof; and
 (c.) 0 to 59.5% by weight of a copolymerizable comonomer, said monomer percentages totaling 100% by weight; and (B.) at least one chelatable metallic salt of a transition metal having a valence greater than 1 and a coordination number greater than 2 and an inorganic or organic anion capable of forming a volatile by-product at ambient temperature or above, said metallic salt present in an amount sufficient to form one or more reversible chelates with said chelating comonomer.

13. The composition of claim 12, wherein said chelating comonomer is 2-hydroxy-3-(2-hydroxy-benzoyloxy)propyl acrylate or methacrylate, 2-hydroxy-3-(1-hydroxy-2-naphthoyloxy)propyl acrylate or methacrylate, 2-hydroxy-3-(2-hydroxy-3-naphthoyloxy)propyl acrylate or methacrylate, 2-hydroxy-3-(2-hydroxy-1-naphthoyloxy)propyl acrylate or methacrylate, or 2-hydroxy-3-(2-hydroxyphenoxy)propyl acrylate or methacrylate and wherein said chelatable metallic salt is a salt of aluminum, zirconium, iron (II or III), copper (II), zinc, nickel, titanium (II or IV), cobalt, or tin (II or IV) and acetylacetonate, acetate, chloride, or a residue of a fatty acid, said salt being present in an amount from about 0.1 to 2 equivalents, based on the equivalent amount of said chelating comonomer.

14. The composition of claim 12, wherein said copolymerizable comonomer is a $C_2$–$C_{10}$ vinyl ester, an amide of acrylic or methacrylic acid, acrylic or methacrylic acid, or mixtures thereof.

* * * * *